United States Patent
Betz et al.

(10) Patent No.: US 9,381,887 B2
(45) Date of Patent: *Jul. 5, 2016

(54) PYROTECHNIC TENSIONER

(71) Applicant: TRW Automotive GmbH, Alfdorf (DE)

(72) Inventors: Hans-Peter Betz, Boebingen an der Rems (DE); Dominik Seitzer, Waldstetten (DE); Ruediger Karl, Weilheim (DE)

(73) Assignee: TRW Automotive GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/378,343

(22) PCT Filed: Feb. 11, 2013

(86) PCT No.: PCT/EP2013/000397
§ 371 (c)(1),
(2) Date: Aug. 13, 2014

(87) PCT Pub. No.: WO2013/120598
PCT Pub. Date: Aug. 22, 2013

(65) Prior Publication Data
US 2015/0027337 A1 Jan. 29, 2015

(30) Foreign Application Priority Data
Feb. 14, 2012 (DE) .......................... 10 2012 002 719

(51) Int. Cl.
*B60R 22/195* (2006.01)
*B60R 22/46* (2006.01)
*C06D 5/00* (2006.01)

(52) U.S. Cl.
CPC ......... *B60R 22/1954* (2013.01); *B60R 22/4628* (2013.01); *C06D 5/00* (2013.01)

(58) Field of Classification Search
CPC ... B60R 22/1954; B60R 22/4628; C06D 5/00
USPC ............... 102/530, 531; 280/728.1, 733, 736, 280/741, 806; 89/1.14; 242/390.5; 60/637
See application file for complete search history.

(56) References Cited

U.S. PATENT DOCUMENTS

| | | | | | |
|---|---|---|---|---|---|
| 2,947,315 | A | * | 8/1960 | Connell | 137/68.13 |
| 3,109,615 | A | * | 11/1963 | Fritz | 244/138 R |
| 3,690,695 | A | * | 9/1972 | Jones et al. | 280/741 |
| 4,399,655 | A | * | 8/1983 | Fohl | 60/637 |
| 4,422,669 | A | | 12/1983 | Chiba et al. | |
| 5,301,979 | A | * | 4/1994 | Allard | 280/737 |
| 5,522,564 | A | * | 6/1996 | Schmidt | B60R 22/4676 242/374 |

(Continued)

FOREIGN PATENT DOCUMENTS

| | | |
|---|---|---|
| DE | 102006052332 | 5/2008 |
| EP | 0 780 271 | 6/1997 |
| WO | 96/00157 | 1/1996 |

*Primary Examiner* — Bret Hayes
(74) *Attorney, Agent, or Firm* — Tarolli, Sundheim, Covell & Tummino LLP

(57) ABSTRACT

A pyrotechnic pretensioner (10) for a safety system in a vehicle has an inflator (22) including a propelling charge (26) and an igniter (32) and including a housing (12) in which a pressure chamber (14) is provided into which gas can flow and in which a piston can be displaced by the gas, an end piece (16) which closes the pressure chamber (14) and in which a chamber (24) is formed into which the propelling charge (26) is filled and whose wall constitutes the wall of the propellant is provided on the housing (12).

17 Claims, 2 Drawing Sheets

(56) References Cited

U.S. PATENT DOCUMENTS

| | | | | |
|---|---|---|---|---|
| 5,593,180 A * | 1/1997 | Cuevas et al. | | 280/741 |
| 5,799,977 A * | 9/1998 | Miyazaki | | B60R 22/4633 |
| | | | | 102/204 |
| 6,189,926 B1 * | 2/2001 | Smith | | 280/737 |
| 6,237,940 B1 * | 5/2001 | Shirk et al. | | 280/730.2 |
| 6,318,754 B1 * | 11/2001 | Einsiedel et al. | | 280/736 |
| 6,382,668 B1 * | 5/2002 | Goetz | | 280/737 |
| 6,419,271 B1 * | 7/2002 | Yamada et al. | | 280/806 |
| 6,857,657 B2 * | 2/2005 | Canterberry et al. | | 280/737 |
| 7,293,797 B2 * | 11/2007 | Nakayasu | | B60R 21/268 |
| | | | | 280/736 |
| 7,360,788 B2 * | 4/2008 | Yano | | B60R 21/272 |
| | | | | 280/737 |
| 7,726,686 B2 * | 6/2010 | Warren et al. | | 280/737 |
| 7,832,768 B2 * | 11/2010 | Singer | | B60R 22/1952 |
| | | | | 280/806 |
| 9,096,191 B2 * | 8/2015 | Betz | | B60R 22/4633 |
| 2002/0093182 A1 * | 7/2002 | Mizuno | | B60R 21/268 |
| | | | | 280/736 |
| 2003/0062713 A1 * | 4/2003 | Young | | B60R 21/2644 |
| | | | | 280/736 |
| 2004/0183292 A1 * | 9/2004 | Ruckdeschel | | 280/741 |
| 2005/0184491 A1 * | 8/2005 | Itoga | | 280/730.1 |
| 2008/0156216 A1 * | 7/2008 | Yoshida | | B60R 21/2644 |
| | | | | 102/202.14 |
| 2009/0085335 A1 * | 4/2009 | Yabuta | | B60R 21/268 |
| | | | | 280/736 |
| 2009/0160167 A1 * | 6/2009 | Itoga | | 280/733 |
| 2009/0184508 A1 * | 7/2009 | Kohama | | 280/806 |
| 2010/0071581 A1 * | 3/2010 | Asanuma et al. | | 102/530 |
| 2010/0164208 A1 * | 7/2010 | Kalandek | | 280/736 |

* cited by examiner

PYROTECHNIC TENSIONER

RELATED APPLICATIONS

This application corresponds to PCT/EP2013/000397, filed Feb. 11, 2013, which claims the benefit of German Application No. 10 2012 002 719.2, filed Feb. 14, 2012, the subject matter, of which are incorporated herein by reference in their entirety.

BACKGROUND OF THE INVENTION

The invention relates to a pyrotechnic pretensioner for a safety system in a vehicle comprising an inflator having a propelling charge as well as an igniter and comprising a housing including a pressure chamber provided therein into which gas can flow and in which a piston can be displaced by the gas.

A pyrotechnic pretensioner, for example an end fitting pretensioner for a seat belt in a vehicle includes an elongate cylindrical housing in which a piston is supported to be movable in the longitudinal direction. On said piston a tension transmission means is fastened which is connected to a component of a vehicle safety system such as an end fitting of a seat belt. In order to displace the piston in the longitudinal direction and thus to achieve, for example, tensioning of the seat belt, a pyrotechnic inflator adapted to generate excess pressure in the chamber for displacing the piston is provided. Usually the housings and the inflators are separately manufactured and are assembled immediately prior to being mounted in a vehicle. For this purpose, a coupling member to which the inflator is connected is provided on the housing. However, this requires increased manufacturing efforts. Moreover, the assembly of these pretensioners is very complicated.

From the state of the art also inflators are known in which at an end piece closing the pressure chamber a seat for the inflator is formed into which the inflator can be simply inserted. However, also in these pretensioners additional components are required to fix the inflator in the end piece and thus on the housing.

Alternatively, there are also known pretensioners in which the propelling charge of the inflator is arranged already in the pressure chamber. However, the assembly of such pretensioners is equally very complicated, as the propelling charge has to be positioned within the pressure chamber and has to be safely protected against external influences.

SUMMARY OF THE INVENTION

It is therefore the object of the invention to provide a pyrotechnic pretensioner having a simpler structure and thus requiring less manufacturing expenditure.

To achieve the object in a pyrotechnic pretensioner for a safety system in a vehicle comprising an inflator that includes a propelling charge as well as a cylinder and comprising a housing having a pressure chamber provided therein into which the gas can flow and in which the gas is adapted to displace a piston, on the housing an end piece is provided which closes the pressure chamber and in which a chamber is present into which the propelling material is filled and whose wall constitutes the wall of the propellant defined by the propelling charge. The invention is based on the consideration to manufacture the housing of the inflator not separately but jointly with the housing of the pretensioner. In accordance with the invention, for this purpose the inflator is formed integrally with the end piece closing the pressure chamber and constituting the end-face housing closure. Said end piece includes a chamber into which the propelling charge is inserted directly without any additional inflator housing. In this way, the number of components is reduced, because no separate inflator housing is required, thereby also the manufacturing expenditure being reduced as no fastening and mounting devices, resp., are required on the individual components.

The chamber for the propelling charge need not be arranged so that it is directly adjacent to the pressure chamber. In the end piece also a gas conduit can be provided which in the case of release provides a fluidic communication between the chamber for the propelling charge and the pressure chamber. The position of the chamber for the propelling charge, i.e. the shape of the end piece, can thus be adapted at will to the mounting conditions in a vehicle so that more freedom of design is offered.

Preferably in the end piece between the chamber for the propelling charge and the pressure chamber a bursting wall is provided. This bursting wall closes off the chamber for the propelling charge toward the pressure chamber so that the propelling charge is safely protected, for example against moisture or other influences. Only in the case of release said bursting wall is ruptured by the excess pressure formed by the ignited propelling charge in the chamber for the propelling charge and thus a fluidic communication is established from the chamber for the propelling charge to the pressure chamber.

Typically, a tension transmission element of a vehicle safety system, for instance of a seat belt, is provided on the piston. The seat belt must be guided out of the housing, i.e. the pressure chamber, in the longitudinal direction so as to ensure proper transmission of the pretensioning force to the safety system. For this reason, preferably the end piece includes a guide passage for such pretensioning element through which the tensioning element is guided out of the housing.

Since the tensile element is guided out of the pressure chamber and thus out of the housing in the longitudinal direction, the chamber for the propelling charge cannot be arranged in the longitudinal direction in extension of the pressure chamber. Therefore, the end piece preferably includes a first portion in which the guide conduit and especially the gas conduit is arranged and a laterally projecting second portion arranged at right angles to the first portion in which the chamber for the propelling charge is arranged. The end piece is hence T-shaped or L-shaped, the first portion serving as closure for the pressure chamber and in the second portion the propelling charge adapted to be in fluidic communication with the pressure chamber via the guide conduit being arranged.

In order to release the inflator preferably an igniter is present on the end piece.

The igniter is provided, for example, on the second portion so that it can be easily reached and the pyrotechnic pretensioner and the inflator, resp., can easily contact the igniter.

Especially the chamber for the propelling charge of the inflator can be closed by the igniter. Hence the chamber is closed on the one side by the bursting wall in this embodiment. On the other side, the chamber is initially open so that the propelling material can be filled into the chamber. After filling the propelling material the chamber is closed by the igniter so that the chamber is hermetically sealed and the propelling charge is safely protected. In this way, moreover the assembly can be further facilitated as no separate elements are required for closing the chamber for the propelling charge.

The end piece can be made of plastic material, for example, hence it can be easily manufactured by injection molding.

In order to ensure higher stability the housing can have a metallic tube at least partly enclosing the end piece.

The igniter is, for example, a pre-fabricated self-contained component separated from the propelling charge by an igniter housing.

BRIEF DESCRIPTION OF THE DRAWINGS

Further advantages and features are found in the following description in concert with the enclosed drawings in which.

DESCRIPTION OF EXEMPLARY EMBODIMENT

Figure 1:
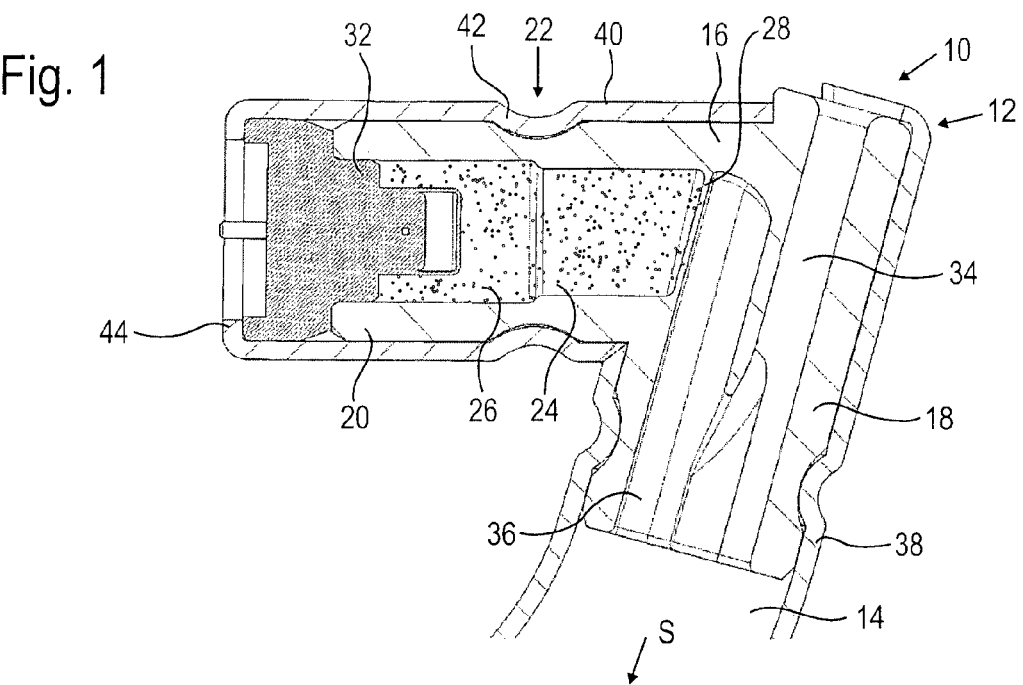
FIG. 1 shows a sectional view across a pyrotechnic pretensioner according to the invention.

FIG. 1 illustrates a pyrotechnic pretensioner 10 for a vehicle safety system. The pyrotechnic pretensioner 10 serves e.g. for pretensioning a seat belt or for pulling an airbag out of the driver's field of view again after release.

The pretensioner 10 includes a housing 12 in which a pressure chamber 14 is provided. In the pressure chamber 14 a piston not shown here is movably supported in a pretensioning direction S. A tensile element connected to the safety system which in the case of release is moved along with the piston into the pretensioning direction S can be fastened to the said piston. In this way it is possible, for example, to pretension a seat belt fastened on the tensile element.

Figure 3:
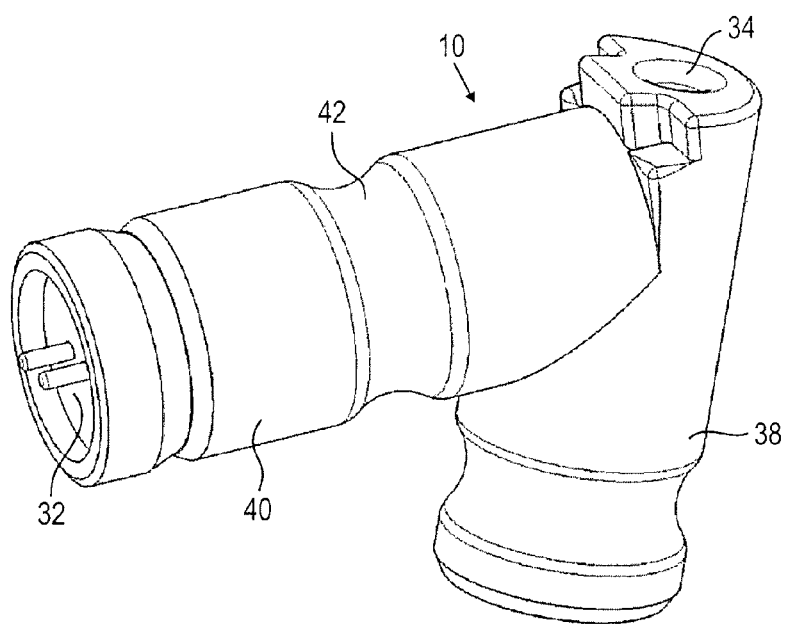
FIG. 3 shows a perspective view of an end piece for the pretensioner of FIG. 1.
Figure 4:
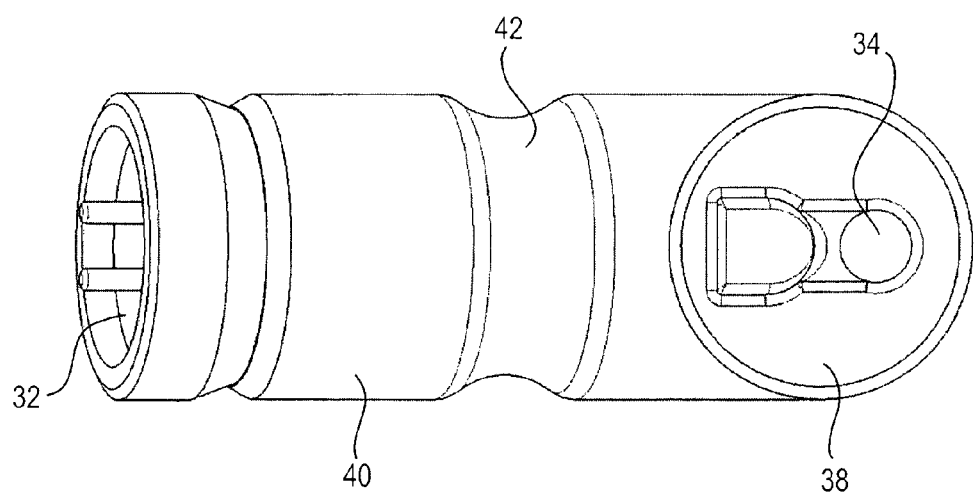
FIG. 4 shows a top view of the end piece of FIG. 3.

The housing 12 is closed by an end piece 16 opposite to the pretensioning direction S. The end piece 16 is integrally made of plastic material and is substantially L-shaped (cf. also FIGS. 3 and 4) having a first portion 18 and a second portion 20.

The first portion 18 serves as end-face closure for the housing 12 and the pressure chamber 14, respectively.

The second portion 20 forms the housing of an inflator 22, as will be shown in the following, by which excess pressure can be generated in the pressure chamber 14 so as to move the piston into the pretensioning direction S.

Figure 2:
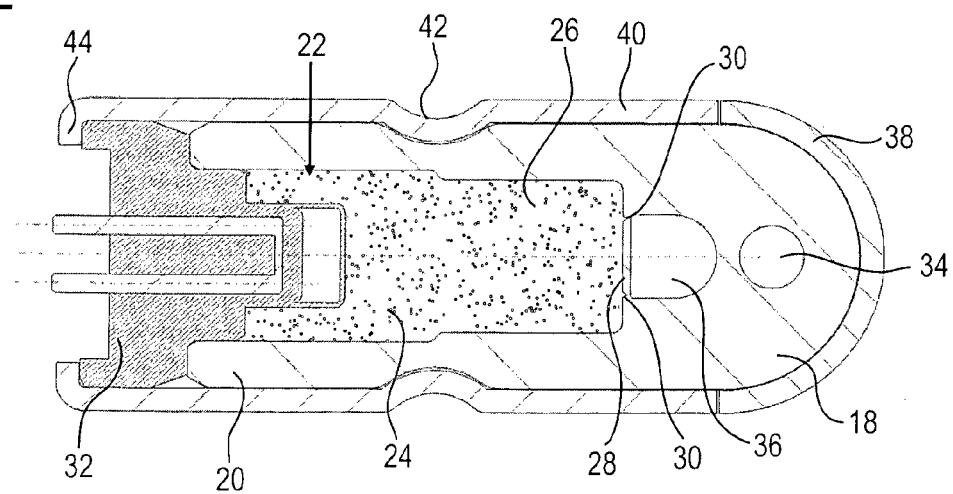
FIG. 2 shows a second sectional view across the pretensioner of FIG. 1.

As is evident from FIGS. 1 and 2, in the second portion 20 a chamber 24 is provided into which a propelling charge 26 can be filled. The walls of this portion 20, i.e. the walls of the end piece 16, in this case constitute the walls of the chamber 24 for the propelling charge and the propellant of the inflator 22, respectively.

The chamber 24 is substantially cylindrical in the embodiment shown here. However, the shape of the chamber 24 can be adapted to the mounting conditions in a vehicle at will, in particular, the chamber 24 need not be cylindrical.

Said chamber 24 is closed toward the pressure chamber 14 in terms of flow by a bursting wall 28.

The bursting wall 28 includes plural predetermined breaking points 30 through which the bursting wall 28 can be opened in the case of release.

The opposite end of the chamber 24 is closed by an igniter 32 into which an igniter plug can be inserted on the rear side.

A guide passage 34 for a tensile element of the safety system which is connected to the piston is provided on the first portion 18. The guide passage 34 extends in the longitudinal direction of the pressure chamber 14 and, respectively, in the pretensioning direction S through the entire first portion 18 of the end piece 16 so that low-friction guiding of the tensile element is possible. The guide passage could as well include deflection means so as to deflect the tensile element in a different direction.

In parallel to the guide passage 34, a gas conduit 36 extending from the rear side of the bursting wall 28 into the pressure chamber 14 is provided on the end piece 16. In the case of release, after opening the bursting wall a fluidic communication between the chamber 14 for the propelling charge 26 and the pressure chamber 14 is established through said gas conduit 36.

In a case of release, the propelling charge 26 is ignited by the igniter 32 arranged in the socket 32. The bursting wall 28 is opened by the excess pressure prevailing in the chamber 24 so that the gas formed by the propelling charge 26 can flow from the chamber 24 into the pressure chamber 14 and can displace the piston in the pretensioning direction S.

Since the entire end piece 16 is integrally formed, the number of components is significantly reduced. No separate housing is required for the inflator. The housing is formed by the walls of the end piece 16 and, resp., by the second portion 20 of the end piece 16.

Since the chamber 24 for the propelling charge 26 is completely closed on the one side by the bursting wall 28 and on the other side by the socket 32, the propelling charge 26 is safely protected against external influences, for example moisture.

Closing the chamber 24 by the socket 32 moreover facilitates filling of the chamber 24. The propelling charge 26 is filled into the chamber 24 before inserting the igniter 32 and the chamber is then closed by the igniter 32.

As is evident from FIGS. 1 and 2, the housing 12 includes interconnected metallic tubes 38 and 40 enclosing the first and, resp., second portions 18, 20 of the end piece 16. The said metallic tubes 38, 40 support the end piece 16.

Preferably, the end piece 16 is made of plastic material so that simple manufacture, for example by injection molding, is possible. Since the inflator 22 is fixedly integrated in the end piece 16, additional fastening devices for fastening the inflator to the housing are dispensed with.

Beads 42 provided in the housing 12 and a bordered end 44 of the housing 12 ensure stable positioning of the end piece 16 in the housing 12.

The invention claimed is:

1. A pyrotechnic pretensioner (10) for a safety system in a vehicle comprising:
    an inflator (22) including a propelling charge (26) as well as an igniter (32);
    a housing (12) in which a pressure chamber (14) is provided into which gas from the inflator (22) flow and in which a piston is displaced by the gas, the housing (12) including metallic tube (38, 40); and
    an end piece (16) closing the pressure chamber (14) and having a wall extending towards the igniter (32) to form a chamber (24) for the propelling charge (26),
    wherein the end piece (16) connects one of the metallic tubes (38) to another of the metallic tubes (40).

2. The pyrotechnic pretensioner according to claim 1, wherein an igniter (32) is provided on the end piece (16).

3. The pyrotechnic pretensioner according to claim 1, wherein the end piece (16) is made of plastic material.

4. The pyrotechnic pretensioner according to claim 1, wherein the metallic tube (38) at least partly encloses the end piece (16).

5. The pyrotechnic pretensioner according to claim 1, wherein the igniter (32) is a pre-fabricated, self-contained component separated from the propelling charge (26) by an igniter housing.

6. The pyrotechnic pretensioner according to claim 1, wherein the wall of the end piece defines a substantially cylindrical chamber for receiving the propelling charge such that the wall engages the propelling charge.

7. The pyrotechnic pretensioner according to claim 1, wherein the wall of the end piece extends the entire length of the propelling charge.

8. The pyrotechnic pretensioner according to claim 1, wherein the end piece includes a first portion extending into one of the metallic tubes along a first direction and a second portion extending into another of the metallic tubes along a second direction angled relative to first direction.

9. The pyrotechnic pretensioner according to claim 1, wherein the wall of the end piece engages the igniter.

10. A pyrotechnic pretensioner (10) for a safety system in a vehicle comprising:
   an inflator (22) including a propelling charge (26) as well as an igniter (32);
   a housing (12) in which a pressure chamber (14) is provided into which gas from the inflator (22) can flow and in which a piston can be displaced by the gas; and
   an end piece (16) closing the pressure chamber (14) and having a wall forming a chamber (24) for the propelling charge (26), wherein a gas conduit (36) is provided in the end piece (16) and forms a fluidic communication between the chamber (24) for the propelling charge (26) and the pressure chamber (14) when the propelling charge (26) is ignited;
   wherein the housing (12) includes interconnected metallic tubes (38, 40) connected by the end piece (16).

11. The pyrotechnic pretensioner according to claim 10, wherein a guide passage (34) for a tensile element of the safety system is provided on the end piece (16).

12. The pyrotechnic pretensioner according to claim 11, wherein the end piece (16) includes a first portion (18) in which the guide passage (34) and the gas conduit (36) is arranged, and a second portion (20) laterally projecting and arranged at an angle to the first portion (18) in which the chamber (24) for the propelling charge (26) is arranged.

13. The pyrotechnic pretensioner according to claim 12, wherein the igniter (32) is provided on the second portion (20) and closes the chamber (24) for the propelling charge (26) of the inflator (22).

14. A pyrotechnic pretensioner (10) for a safety system in a vehicle comprising:
   an inflator (22) including a propelling charge (26) as well as an igniter (32);
   a housing (12) in which a pressure chamber (14) is provided into which gas from the inflator (22) can flow and in which a piston can be displaced by the gas; and
   an end piece (16) closing the pressure chamber (14) and having a wall forming a chamber (24) for the propelling charge (26), wherein a bursting wall (28) is provided in the end piece (16) between the chamber (24) for the propelling charge (26) and the pressure chamber (14),
   wherein the housing (12) includes interconnected metallic tubes (38, 40) connected by the end piece (16).

15. A pyrotechnic pretensioner for a safety system in a vehicle comprising:
   an inflator including a propelling charge and an igniter;
   a housing including first and second metallic tubes and a pressure chamber into which gas from the inflator can flow and in which a piston can be displaced by the gas; and
   an end piece closing the pressure chamber and extending into the first and second tubes to interconnect the first and second tubes, the wall of the end piece defining a chamber extending the entire length of the propelling charge for receiving the propelling charge.

16. The pyrotechnic pretensioner according to claim 15 wherein the end piece includes a first portion extending into the first tube along a first direction and a second portion extending into the second tube along a second direction angled relative to the first direction.

17. The pyrotechnic pretensioner according to claim 15, wherein the wall of the end piece engages the propelling charge.

* * * * *